Figure 1:
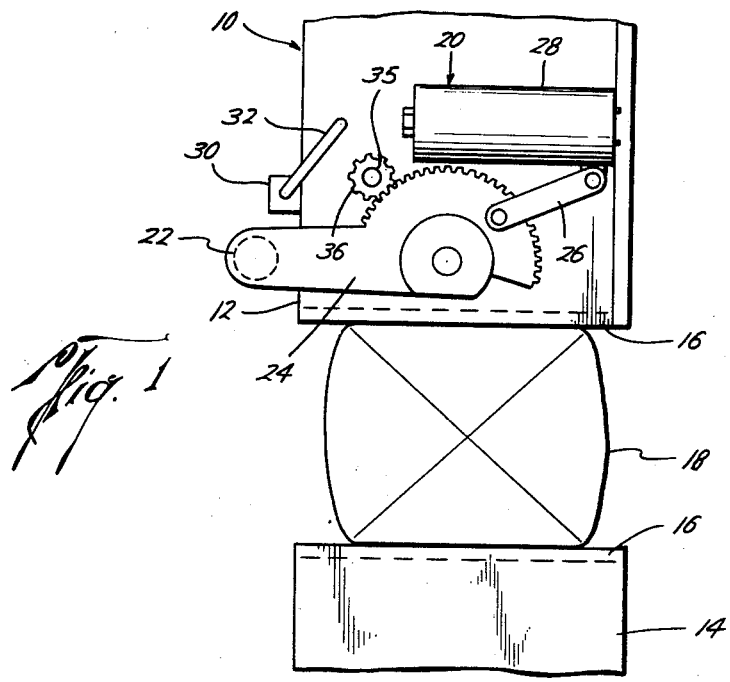

May 5, 1964     A. C. SINCLAIR ETAL     3,131,626
BALE UNLOADER

Filed Jan. 28, 1963     4 Sheets-Sheet 1

Alfred C. Sinclair
Stuart W. Sinclair
INVENTORS

BY
James F. Weiler
Jefferson D. Giller
William A. Stout
Paul L. DeVerter II

ATTORNEYS

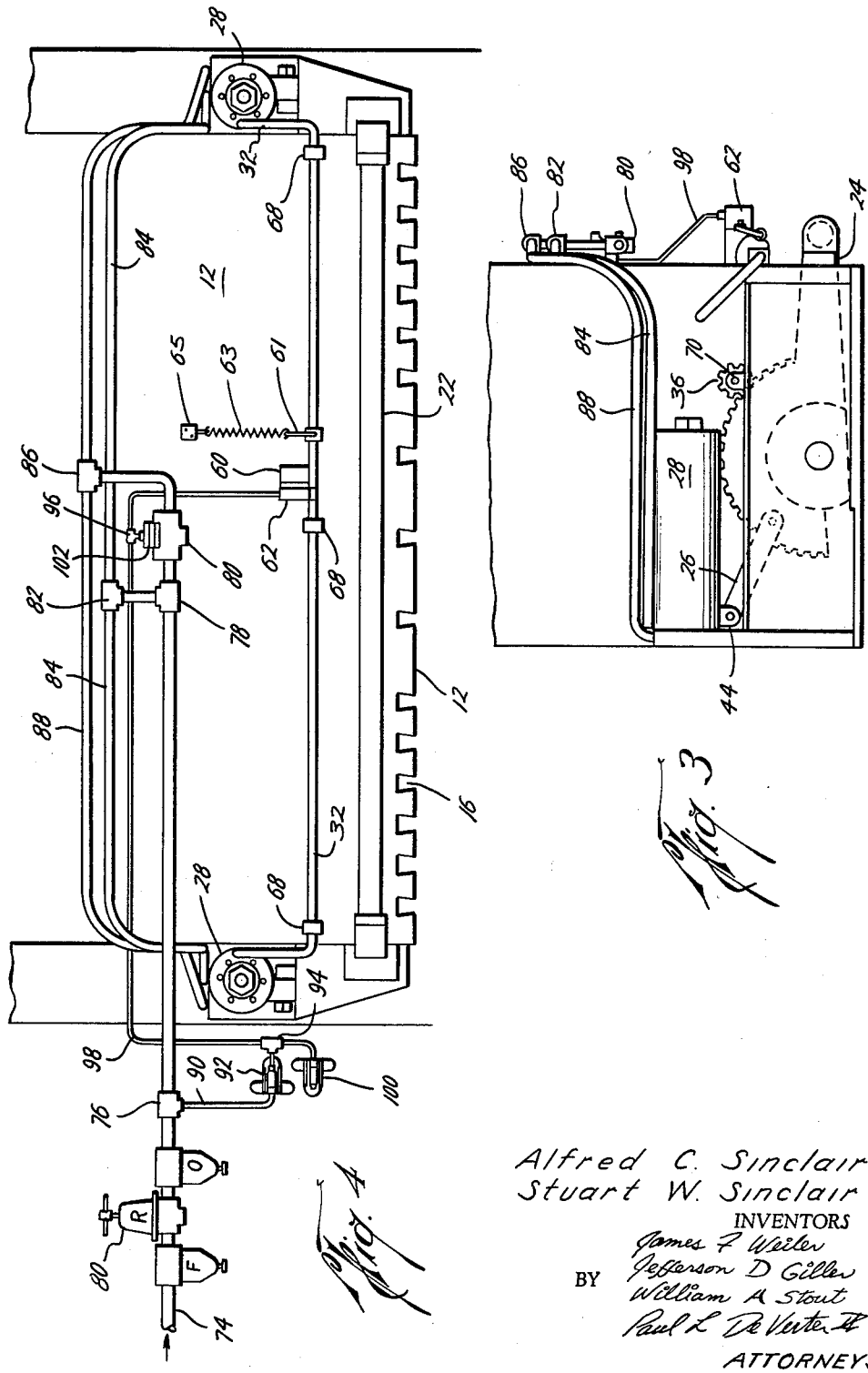

May 5, 1964  A. C. SINCLAIR ETAL  3,131,626
BALE UNLOADER
Filed Jan. 28, 1963                                4 Sheets-Sheet 3

Alfred C. Sinclair
Stuart W. Sinclair
James P. Weiler
Jefferson D Giller
William A Stout
Paul L DoVerter II
INVENTORS
BY
ATTORNEYS

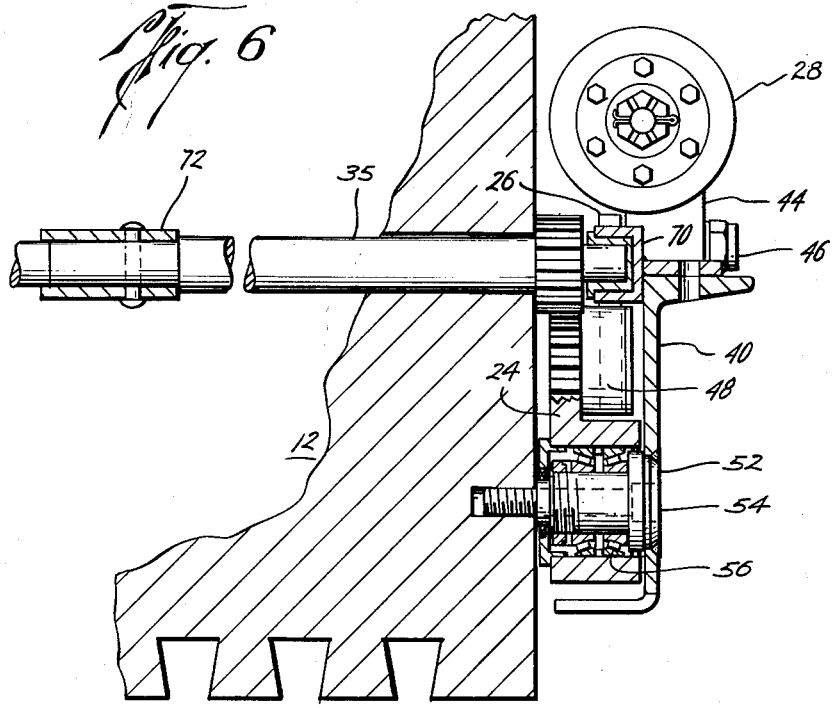
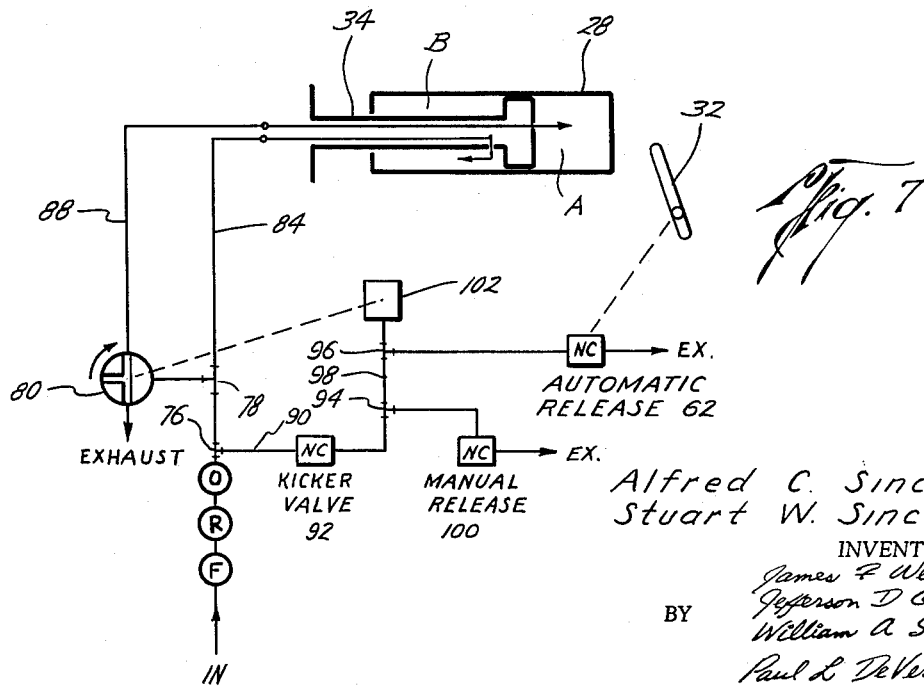

United States Patent Office 3,131,626
Patented May 5, 1964

3,131,626
BALE UNLOADER
Alfred C. Sinclair, Bellaire, and Stuart W. Sinclair, Houston, Tex., assignors to Anderson, Clayton & Co., Houston, Tex., a corporation of Delaware
Filed Jan. 28, 1963, Ser. No. 254,176
2 Claims. (Cl. 100—218)

The present invention relates to unloading bales, and more specifically relates to a method and means for removing or kicking a compressed cotton bale from between the platens of a compress after the bale has been tied.

The cotton press utilized at compresses is a massive piece of equipment, often having a total platen stroke of 8 feet 6 inches. The press is arranged so that the doors are braced in their closed position by great toggle links which, with the doors, retract into a pit provided for that purpose, and which pit is finally covered by another wooden door called a "stage" on which the workmen walk. The cotton fiber is placed between the platens of the compress in the form of a loose bale by a workman known as the "feeder." Thereupon, the stages open and the doors close, laterally restraining and guiding the bale while the lower platen is pulled upwardly by steam or hydraulic power, thus compressing the bale. Upon completion of the compressing cycle, the doors retract into the pit and the stages close, whereupon workmen known as "shovers" walk in on the stages to insert steel bands through appropriate channels or grooves in the platen to workmen on the other side of the bale known as "reefers" who return the steel bands so that the compressed bale of cotton is encircled. Then the shovers proceed to buckle the bands together so as to retain the major portion of the density resulting from the compressing action of the press. After the bale has been tied with the bands and as the platens are opened, two workmen, either shovers or reefers, acting as "throw-out men," have the task of removing the compressed and tied bale from the lower platen. This is typically accomplished by the use of throw-out bars which comprise long metal rods, one end of which is capable of being placed in the grooves of the platen beneath the bale, and the other end being attached to the press body by a chain.

Thus, the throw-out men insert one end of their respective throw-out bars in the platen grooves as the bale moves downwardly with the lower platen. Soon, the end of the loose chain becomes taut, and further downward movement of the platen results in the throw-out bar tending to topple the bale from the press. Considerable effort must be exerted by the throw-out men to hold the throw-out bar under the bale, so as to roll the bale out of the platen area. Failure to hold the end of the bar within the groove results in the throw-out bar kicking backwardly against the throw-out men, not only causing injury, but delaying the next loading and pressing cycle.

After the bale is ejected, the throw-out bars are replaced on appropriate hooks on the press body, and the throw-out men squeeze to either side of the press loading stage to allow the feeder to proceed with the insertion of the next bale. Typically, the throw-out men are able to eject the compressed bale and jump off of the press stage just before the stages begin to tilt and the doors close on the next bale. It is, therefore, apparent that a saving in time could be accomplished if the bale were consistently ejected in a more efficient manner. Further, if a mechanical means were provided for unloading the compressed bale from the press, the safety of the press workers would be substantially increased. Thus, it is an object of the present invention to provide a mechanical device and a method for obtaining the foregoing results.

Further, it is an object of the present invention to provide a bale unloader which includes a kicker bar pivotably suspended from the upper platen, which bar may be rotated upon the opening of the platens in such a manner that it will push or kick the compressed and tied bale from the press, whereupon the bar may be immediately retracted to allow subsequent feeding operations.

Yet another object of the present invention is to provide a method for removing bales from between compress platens, which method includes separating the platens, contacting the bale with the kicker bar, and pushing the bale with the bar until the bale clears the platens. The method may also include retracting the bar from between the platens, immediately after the bale has cleared.

From the foregoing objects, it will be apparent that considerable savings in loading and unloading time of the press will ensue. More specifically, by means of the present invention, the stage is cleared of throw-out men so that the feeder can get into position more readily. Further, the lever man (or operator of the press) can drop the lower platen faster because there is no delay in taking up slack in the throw-out bar chains or in controlling the lowering speed of the platen so that it is coordinated with the efforts of the throw-out men. Further, since it is contemplated that the kicker bar of the present invention will have removed the compressed bale and returned it to its original position before the platens are opened enough to admit the uncompressed succeeding bale, the feeding process for the next bale will be faster. Also, the removal of the throw-out men allows the workers, who also perform other functions, to remove themselves from the area of rising stages and closing doors with more time to spare, and thus increases the overall safety aspects.

Figure 2:
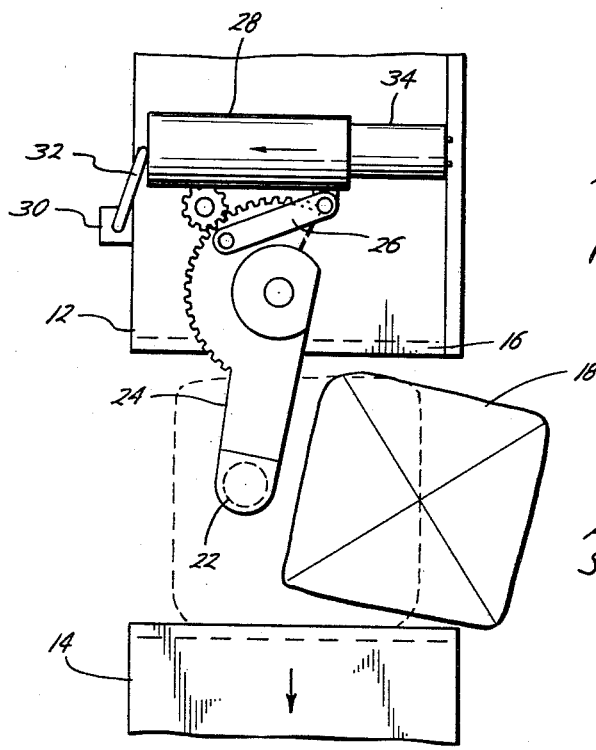
Figure 5:
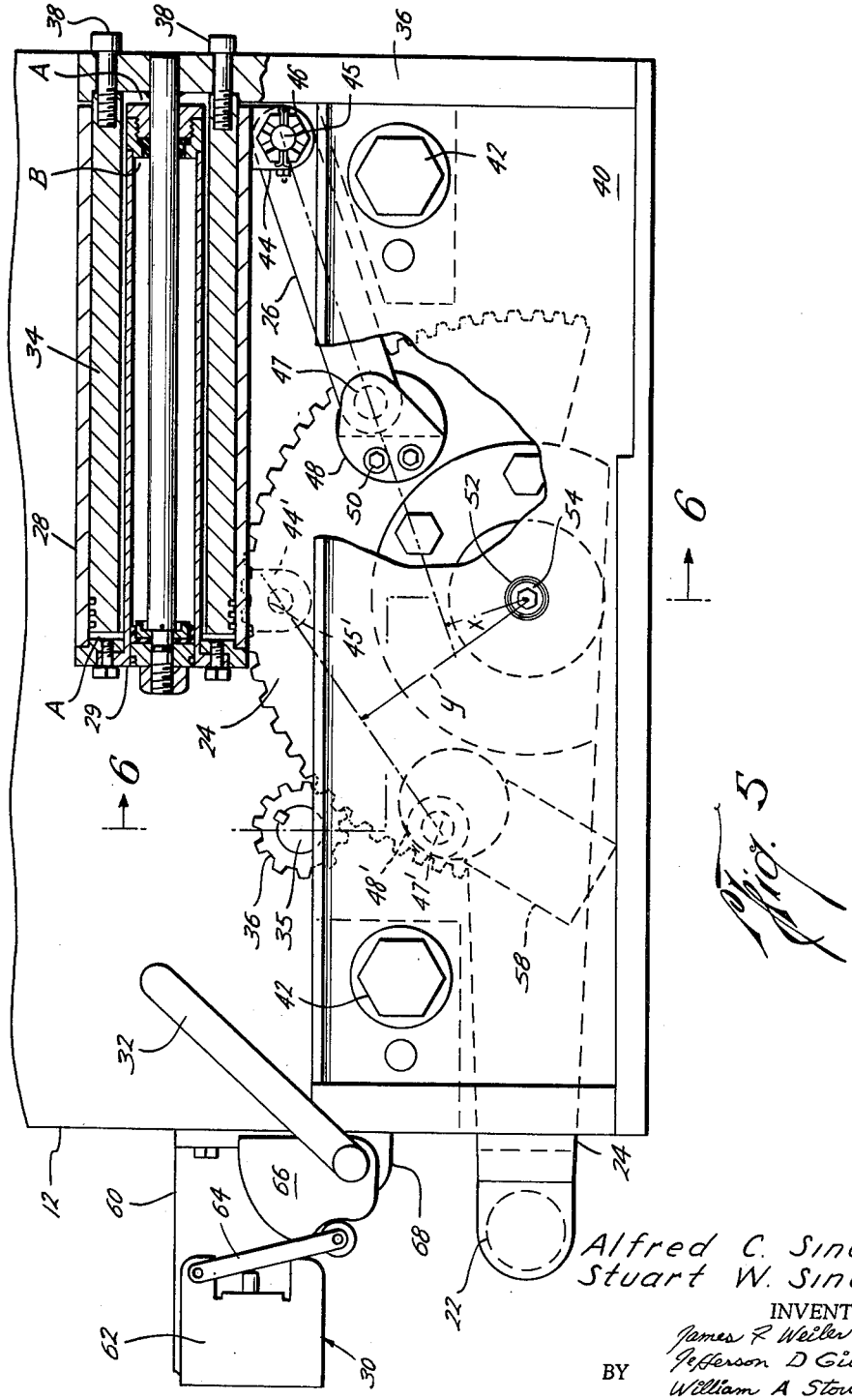

Other and further objects, features, and advantages will be apparent from the following description of a presently preferred embodiment of the invention, given for the purpose of disclosure, taken in conjunction with the accompanying drawings, where like character references designate like parts throughout the several views, and where:

FIGURE 1 is a partial sectional side view showing the bale unloader of the present invention in retracted position with the platens pressing the bale and doors open, FIGURE 2 is a view similar to FIGURE 1, showing the bale unloader of the present invention in the process of kicking the compressed bale from between the opening platens, FIGURE 3 is a partial sectional side view, taken from the side opposite that of FIGURE 1, showing in more detail some of the fluid piping, FIGURE 4 is a partial back view showing the piping and components, FIGURE 5 is a partial sectional side view enlarged from that of FIGURE 1, showing the mechanism in detail, FIGURE 6 is a partial sectional back view taken along the line 6—6 of FIGURE 5, and FIGURE 7 is a fluid schematic diagram of the mechanism.

Generally, the apparatus of the invention comprises a kicker bar pivotally mounted on one of the platens of a press, which kicker bar is pivoted or rotated by means of at least one fluid motor. The apparatus further includes appropriate valves for actuating and retracting the kicker bar.

Referring now to FIGURE 1, the reference numeral 10 generally designates the compress or large cotton press, which includes the fixed upper platen 12 and the movable lower platen 14. Transversely mounted in the platens 12 and 14 are the grooves 16, through which the steel bands are inserted for tying the compressed bale 18. Mounted on the upper platen 12, in a manner hereinafter described, is the bale unloader 20 which generally includes the kicker bar 22, the segmented arm 24, the link 26, and the fluid cylinder 28. Further, mounted on the upper platen 12 is the limit switch assembly 30, with its control arm 32, as well as the equalizer rod 35 and equalizing gear 36 which is meshed with the segmented arm 24.

Comparing FIGURES 1 and 2, the operation of the present invention when unloading a bale will be illustrated. Thus, as the lower platen 14 moves downwardly, so that the bale 18 is no longer tight between the platens 12 and 14, the cylinder 28 is actuated, in a manner to be hereinafter described, which cylinder moves in the direction of the arrow, thus pushing the link 26, which in turn rotates the segmented arm 24 bringing the kicker bar 22 into contact with the bale 18. Further movement of the cylinder 28 results in the kicker bar 22 pushing or kicking the bale 18 from between the platens 12 and 14. As the cylinder 28 nears the end of its stroke, it contacts the control arm 32, which in turn actuates the limit switch 30, resulting in the reversal of movement of the cylinder 28, thereby retracting the kicker bar 22 from the position shown in FIGURE 2 to that shown in FIGURE 1. In this manner, the compressed bale 18 is readily removed from the compress 10 by means of the bale unloader 20.

Referring now to FIGURE 5, it will be noted that the cylinder 28 is slidably mounted on the elongate piston 34, which is in turn suitably attached to the plate 36, as by the bolts 38. Plate 36 is attached, as by welding, to the beam 40, which is, in turn, bolted to the upper platen 12 by means of the bolts 42 and 54. It is, of course, apparent that other means for attaching these various parts are within the skill of the art. As seen in FIGURES 1 and 2, the cylinder 28 is quite large as is the piston 34 so that a considerable amount of rigidity is secured, as well as providing a place for attaching the piston 34 to the plate 36. With particular reference to FIGURE 5, and in comparison with the schematic shown in FIGURE 7, it will be noted that the cylinder 28 is doubled upon itself within the framework of the piston 34 in order to provide a double acting piston having face areas A and B. As will be mentioned further hereinafter, the face area A is utilized to rotate the kicker bar 22, while the face area B is utilized to retract the kicker bar 22 and hold it in its retracted position. Further, the piston face area A is greater than the piston face area B, due to the presence of the piston rod extending through face area B. The complicated form of the doubled over cylinder 28 enables the cylinder 28 to be compressed in overall length and further permits the attachment of the link 26 adjacent the plate 36 when the cylinder 28 is retracted, and in addition provides greater strength at the point of attachment of the fluid motor to the frame. It is, of course, now apparent that other forms are possible.

Attached to and depending from the outer wall of the cylinder 28 is a lug 44, to which is pivotably attached, by means of the bolt 46, the link 26. The lug 44 is more clearly seen in FIGURES 3 and 6.

The opposite end of the link 26 is pivotally attached to the boss 48, which is in turn attached to the segmented arm 24, as by means of the screws 50.

As was previously mentioned, the segmented arm 24 is pivotally mounted on the platen 12, this pivotal mounting being accomplished by the shouldered bearing shaft 52. Thus, and now referring particularly to FIGURE 6, it is seen that the shaft 52 is attached to the plate 40 by means of a welded connection and plate 40 is attached to the upper platen by means of the bolts 42 and 54, seen in FIGURE 5. Also, with reference to FIGURE 6, it is seen that suitable roller bearings 56 are mounted between the shaft 52 and segmented arm 24, to reduce friction.

Referring again to FIGURE 5, it will be noted that the segmented arm 24 extends beyond the end of the upper platen 12, and terminates in the kicker bar 22. Thus, it is seen that actuation of the cylinder 28 results in the cylinder moving along the piston 34, thereby pulling the lug 44 with the cylinder 28 and thus transmitting the linear motion of the cylinder 28 into the rotating motion of the segmented arm 24 by means of the pivotably mounted link 26.

It is now apparent that means other than the link 26 may be used to interconnect the cylinder 28 with the segmented arm 24. However, the link 26 is preferred for an important reason. Referring to FIGURE 1, it will be noted that the kicker bar 22 must move some distance before contacting the bale 18. During this movement very little torque is needed, hence the leverarm or torque arm of the unloader 20 need not be long. But when the kicker bar 22 contacts the bale 18 and begins to eject it from between the platens, then the torque necessary to rotate the arm 24 increases considerably.

To overcome the increased torque, it would be necessary to apply more pressure to the cylinder 28 or else to increase the effective leverarm. Since the pressure available at a gin or compress is usually fairly constant, the present invention effectively changes the leverarm. Referring again to FIGURE 5, it will be noted that when an extended line is drawn through the pivot points 45 and 47 of the link 26, and a perpendicular is erected from this line to the center of the bolt 54 (the pivot point of the arm 24), this perpendicular has a length $x$. Further, when the cylinder 28 reaches the end of its stroke, such as in FIGURE 2, then the lug 44 is shown in dotted lines in FIGURE 5 as 44'. Therefore, when a line is drawn through the link 26 when in the ejecting position, this line connects pivot points 45' and 47', and a perpendicular thereto to the center of bolt 54 has a length $y$. Thus it is seen that the length of the effective leverarm has increased from $x$ to $y$ as the cylinder moves under substantially constant pressure during the ejection or unloading cycle. Hence, the torque applied to the kicker bar has increased at a time when this increased torque is necessary to push the bale 18.

Further, advantageously, at the beginning of the stroke of the cylinder 28, the arm 24 will rotate or pivot rapidly due to the short leverarm, and then begin to slow down and gain power as the bale is contacted. Thus, the preferred embodiment provides a rapid approach and then a slower push with increased power.

Shown in dotted lines in FIGURE 5 is a boss 48' which represents the farthest rotated position of the segmented arm 24. At this position it will be noted that the boss 48' has contacted the stop 58 which is attached to the beam 40 to prevent excessive rotation of the arm 24. An approximation of the position of the segmented arm 24 when the boss 48 is in the position 48' against the stop 58 may be seen by referring to FIGURE 2.

However, in actual practice, it is not contemplated that the boss 48 will engage the stop 58. Instead, the automatic return feature of the present invention will be actuated prior to the time that the boss 48 could contact the stop 58. Mounted on the platen 12 is the limit switch assembly 30 which includes the bracket 60, the automatic release switch 62, and the actuating roller arm 64. Rotatably mounted adjacent the back of the platen 12 is the control arm 32 and attached to the control arm is the cam 66. As can be seen by referring to FIGURE 4, the control arm 32 is attached to the platen 12 by means of the journals 68, and it will further be noted that the ends of the control arm 32 may be contacted by the end of the cylinder 28. Thus, referring again to FIGURE 5, it is seen that during the linear movement of the cylinder 28, it will engage the control arm 32, rotating the control arm about the journals 68, thus rotating the cam 66 which actuates the automatic release switch through the roller arm 64. The control arm 32 is so placed that the switch 62 is actuated by the cylinder 28 prior to the boss 48 engaging the stop 58.

Suitably attached to the control arm 32 is a lever 61. Attached to the lever 61 is a spring 63 which is fastened by means of a bracket 65 to the upper platen 12. By means of this arrangement, the control arm 32 is maintained in the position shown in FIGURES 1 and 3, except when contacted by the cylinder 28 as shown in FIGURE 2, and therefore, except upon actuation by the cylinder 28, the cam 66 shown in FIGURE 5 does not actuate the switch 62.

Now with reference to FIGURE 4, it will be noted that two cylinders 28 are provided, one on each side of the upper platen 12. Each of these cylinders 28 in turn rotate similar segmented arms 24 which are connected by the kicker bar 22. As was mentioned with reference to FIGURES 1 and 2, and as shown in FIGURE 5, the segmented arm 24 includes gear teeth which mesh with the equalizer gear 36, which is in turn attached or keyed to the equalizer rod 35. With reference now to FIGURE 6, it will be seen that the equalizer rod 35 is rotatably mounted in the bearing 70 which is attached to the beam 40, and that further, the equalizer rod 35 extends across the platen 12, where it terminates in a similar equalizer gear 36 which engages the similar segmented arm 24. Although the equalizer gear and rod have been deleted from FIGURE 4 for purposes of clarity, the equalizer gear 36 on the opposite side of the press is shown in FIGURE 3.

As further seen in FIGURE 6, the equalizer rod 35 may consist of several shorter pieces appropriately joined by a coupling 72. The function of the equalizer is to pivot both ends of the kicker bar 22 equally. It is possible that one of the cylinders 28 may be deleted, but it is preferred that both be utilized to lessen the chance of distortion or twisting of the kicker bar 22.

In the operation of the presently preferred embodiment of the invention, compressed air is utilized to actuate the two cylinders 28. However, it is apparent that any form of fluid power may be utilized to actuate the cylinders. With reference to FIGURE 4, it will be noted that the compressed air comes in pipe 74 and passes through filter F, regulator R, and oiler O. Typically, compressed air is supplied or available at compresses at pressures higher than that needed for actuation of the present invention, hence the regulator R may be utilized to reduce the line pressure in the pipe 74 from say 120 p.s.i. to a more convenient pressure, each as 80 p.s.i. The filter F is utilized to remove particles and other foreign matter from the compressed air while the oiler O is utilized to lubricate the equipment downstream from the regulator R. Passing downstream from the oiler O, the compressed air reaches the T 76 and proceeds to the T 78 and the main 3-way valve 80. Connected to the T 78 is another T 82 from which the compressed air is led to the cylinder 28, through the line 84. Connected with the downstream side of the valve 80 is the T 86 to which are connected the lines 88 which are also connected to the cylinder 28.

Connected to the T 76 is the pilot line 90 which is in turn connected to the normally closed kicker valve 92. Downstream from the kicker valve 92, and attached in parallel therewith through the T's 94 and 96 and line 98 are a normally closed release valve 100, the automatic release valve 62 and the pilot valve 102. As was previously mentioned, the automatic release valve 62 is actuated by the control arm 32. The pilot valve 102 is mechanically linked with the 3-way valve 80 in a conventional manner.

With reference now to FIGURE 7, operation of the compressed air system will be explained. As was previously mentioned, the cylinders 28 are identical, consequently only one such cylinder is shown in FIGURE 7 as they are connected in parallel. The cylinder 28 is double acting in that pressure may be applied to either side, A and/or B, thereby positively actuating or retracting the kicker bar 22. The compressed air comes into the bale unloader through the filter F, regulator R, and oiler O, through the T 76 and T 78 whereafter it passes through line 84 to the cylinder 28 and acts upon the piston 34, side B, to hold the cylinder 28 in a retracted position. This is the position shown in FIGURES 1, 3, and 5.

In order to actuate the kicker bar 22, an operator (typically the leverman) at the press pushes the kicker valve 92 which allows a charge of compressed air to move from the T 76 through the kicker valve 92 and into the parallel circuit connected by the lines 98. As was previously mentioned, a manual release valve 100 and the automatic release valve 62 are normally closed, therefore the compressed air charge remains within the line 98, and in so doing actuates the pilot valve 102 which is mechanically connected with the main 3-way valve 80. Therefore, the pilot valve 102 actuates the 3-way valve 80, rotating it in the direction of the arrow shown in FIGURE 7 which results in connecting the T 78 through the valve 80 with the line 88 and thus through the piston 34 to the cylinder 28, side A. As the charge of air in the line 98 is not vented or exhausted, the 3-way valve 80 remains actuated, feeding additional compressed air through the line 88 into the cylinder 28, side A. Due to the absence of a piston rod on side A of the piston connected to the line 88, the effective piston area is greater than that which is fed by the line 84, and shown as side B. Therefore, the pressure on side A while equaling that on side B, acts upon a larger effective piston area, resulting in the cylinder 28 moving and pushing the link 26 which in turn rotates the segmented arm 24 to the position shown in FIGURE 2. As the cylinder 28 moves linearly the bale is ejected, and the cylinder 28 engages the control arm 32 which as was previously discussed, is mechanically linked to the automatic release valve 62. Thus, the cylinder 28 strikes the control arm 32 which opens the normally closed automatic release valve 62, thus allowing the trapped charge of air within the line 98 to exhaust. Immediately upon exhaustion of the charge within the line 98, the pilot valve 102 releases the main 3-way valve 80 which in turn returns to the position shown in FIGURE 7 and exhausts the charge of air in the side of the piston labeled A back through the line 88 to atmosphere. Since the compressed air has always remained connected to side B of the cylinder 28, the difference in pressure immediately serves to return the cylinder 28 to the position shown in FIGURE 1, thus retracting the kicker bar 22.

If for some reason the operator desires to retract the kicker bar prior to its automatically engaging and actuating the automatic release valve 62, the operator may actuate the manual release valve 100 which will serve to exhaust the charge of air within the line 98, thus performing the same function as the automatic release valve 62. It is, of course, now apparent that the kicker bar may be retracted by other and conventional means, instead of the piston side B described above. However, the present embodiment of the invention has the advantage of positive retraction of the kicker bar 22, with very little expenditure of energy, and avoids the space which would be wasted or appropriated with a spring or some other return or retraction means.

Thus, it is seen that the apparatus of the present invention provides an efficient, speedy, and safe mechanism for the ejection of a compressed bale from the platen of a cotton compress, or the like.

From the foregoing description of the apparatus, it is felt that the method of the present invention will now be apparent. To summarize the steps, therefore, the new method for removing bales from between compress platens comprising the steps of separating the platens, contacting the bale with a kicker bar, and pushing the bale with the bar until the bale clears the platens. Further, the method may also include the step of retracting the bar from between the platens, immediately after the bale has cleared. Advantageously, the method of the present invention is quite useful in that it eliminates the necessity of throwout men on the compress stage during the ejection period, and further serves to push instead of roll the bale from between the platens at the very moment that the platens begin to separate, instead of having to wait until a throw-out bar can be inserted under the bale and the throw-out bar chain becomes taut. Of course, the apparatus embodiment described above may be utilized in the performance of the method, but the method is not intended to be limited to the apparatus shown. The phrase separating the platens, or its equivalent, does not mean that the upper and lower platens are in direct contact, but instead connotes that the bale is no longer being compressed by the platens, and that the platens have started to open or move further apart.

The present invention, therefore, is well adapted to carry out the objects and attain the ends and objects mentioned as well as others inherent therein. While a presently preferred embodiment of the invention has been given for the purpose of disclosure, numerous changes in the details of construction, and the combination, shape, size, arrangement of parts, and uses may be resorted to without departing from the spirit and scope of the invention as hereinafter claimed.

What is claimed is:

1. A bale unloader for ejecting a compressed and tied bale from between the platens of a compress having vertically spaced horizontally disposed platens, including An arm pivotably mounted on each side of the upper platen, a kicker bar interconnecting each arm, a fluid cylinder adjacent each side of the upper platen, a double acting piston mounted in each cylinder and attached to the upper platen, each piston having first and second faces, the effective area of the first face being greater than that of the second face, a link pivotably interconnecting the cylinder and arm on each side of the platen, said piston first face arranged to pivot said arm when fluid pressure is impressed thereon, said piston second face arranged to hold said arm adjacent said platen when fluid pressure is impressed thereon, a three-way fluid valve arranged to fluidly interconnect the first face of the piston with the atmosphere in a first position and interconnect the first and second faces of the piston in a second position, fluid supply conduits interconnecting said piston faces independently with said three-way valve, a normally closed kicker valve fluidly connected to said supply conduit, a pilot valve and a normally closed release valve fluidly connected in parallel with said kicker valve, said pilot valve mechanically connected to said three-way valve and arranged to move said three-way valve from said first to said second position when a fluid charge is impressed thereon, and said release valve mounted on said upper platen and arranged to be opened when said cylinder nears the end of its stroke.

2. The invention of claim 1 wherein, each arm includes a gear segment radially disposed from its pivot, an equalizer gear meshed with each arm gear segment, and a rod journaled in said upper platen and mechanically interconnecting each equalizer gear.

References Cited in the file of this patent

UNITED STATES PATENTS

| 235,294 | Riesel | Dec. 7, 1880 |
| 236,609 | Miller | Jan. 11, 1881 |
| 872,885 | Anderson | Dec. 3, 1907 |
| 1,469,689 | Prius | Oct. 2, 1923 |
| 1,737,563 | Boschert | Dec. 3, 1929 |
| 1,862,173 | Bertram | June 7, 1932 |
| 2,625,310 | Davis | Jan. 13, 1953 |
| 2,780,989 | Guy | Feb. 12, 1957 |
| 2,996,756 | Korsch et al. | Aug. 22, 1961 |
| 3,039,636 | Hoyt et al. | June 19, 1962 |

FOREIGN PATENTS

| 1,179,186 | France | Dec. 15, 1958 |
| 72,621 | France | Nov. 23, 1959 |
| | (Addition of 1,179,186) | |
| 176,621 | Sweden | Sept. 19, 1961 |